US 11,746,588 B2

(12) United States Patent
Schuler

(10) Patent No.: US 11,746,588 B2
(45) Date of Patent: Sep. 5, 2023

(54) METHOD FOR FORMING A CLOSED FRAME-SHAPED SPACER FOR AN INSULATING GLASS PANE

(71) Applicant: Glaston Germany GmbH, Neuhausen-Hamberg (DE)

(72) Inventor: Peter Schuler, Tiefenbronn (DE)

(73) Assignee: Glaston Germany GmbH, Neuhausen-Hamberg (DE)

(*) Notice: Subject to any disclaimer, the term of this patent is extended or adjusted under 35 U.S.C. 154(b) by 1197 days.

(21) Appl. No.: 16/017,245

(22) Filed: Jun. 25, 2018

(65) Prior Publication Data

US 2018/0305973 A1 Oct. 25, 2018

Related U.S. Application Data

(63) Continuation of application No. PCT/EP2016/082635, filed on Dec. 23, 2016.

(51) Int. Cl.
*E06B 3/663* (2006.01)
*E06B 3/673* (2006.01)
*B32B 37/15* (2006.01)

(52) U.S. Cl.
CPC ...... *E06B 3/66328* (2013.01); *E06B 3/66357* (2013.01); *E06B 3/6733* (2013.01); *E06B 3/67334* (2013.01); *B32B 37/15* (2013.01)

(58) Field of Classification Search
CPC ............... E06B 3/66328; E06B 3/6733; E06B 3/67326; E06B 3/67391; B32B 37/0076
USPC .................................................. 156/107, 109
See application file for complete search history.

(56) References Cited

U.S. PATENT DOCUMENTS

| 4,756,789 A * | 7/1988 | Kolff ................... B29C 66/8362 |
| | | 156/391 |
| 5,961,759 A * | 10/1999 | Schubert ................. B29C 48/07 |
| | | 156/109 |
| 8,101,251 B2 * | 1/2012 | Scott ..................... C08F 283/12 |
| | | 428/34 |
| 2016/0326794 A1 * | 11/2016 | Mader ................ E06B 3/67326 |

FOREIGN PATENT DOCUMENTS

| DE | 44 33 749 A1 | 3/1996 |
| DE | 102014 115 218 B3 | 4/2016 |
| WO | 2015/113080 A1 | 8/2015 |
| WO | 2016/062601 A1 | 4/2016 |

* cited by examiner

*Primary Examiner* — Carson Gross
(74) *Attorney, Agent, or Firm* — ORBIT IP

(57) ABSTRACT

A method for forming a closed frame-shaped spacer for an insulating glass pane by applying a paste-like and subsequently hardening strand has at a beginning of the strand a ramp in which the thickness of the strand increases from zero to a nominal thickness. An end of the strand's thickness is complementary to the rising ramp on the same path, overlapping the ramp, decreasing from the target thickness to zero, the surface of the ramp forming an interface between the beginning and the end of the strand. The beginning and end of the strand are pressurized on either side by placing it between a first jaw and a second jaw. The exerting surface of the first jaw has a property enabling the material of the strand which comes into contact with the surface of the first jaw to be removed therefrom by lifting the first jaw from the strand.

23 Claims, 11 Drawing Sheets

METHOD FOR FORMING A CLOSED FRAME-SHAPED SPACER FOR AN INSULATING GLASS PANE

CROSS-REFERENCE TO RELATED APPLICATIONS

This continuation application claims priority to PCT/EP2016/082635 filed on Dec. 23, 2016 which has published as WO 2017/114795 A1 and also the German application number 10 2015 122 882.3 filed on Dec. 29, 2015, the entire contents of which are fully incorporated herein with these references.

DESCRIPTION

Field of the Invention

The invention is based on a method for forming a closed frame-shaped spacer for an insulating glass pane by application of an initially pasty strand which subsequently consolidates, delimited by a lower side, an upper side and two side faces, and which has a nominal thickness between the lower side and the upper side as well as a nominal width between the two side faces, onto a glass plate along the edge of the glass plate in a manner such that at a start of the strand, its thickness comprises a ramp over a section with a predetermined length, wherein the thickness of the strand increases from zero to the nominal thickness. At an end of the strand, said thickness decreases from the nominal thickness to zero in a manner which is complementary to the increasing ramp over the same section, overlapping the ramp, so that the surface of the ramp forms an interface between the start and the end of the strand.

Background of the Invention

A method of this type is known from DE 44 33 749 C2.

The term "lower side" is used to describe that side of the strand which comes into contact with the glass plate. The term "upper side" is used to describe the side of the strand opposite to the lower side. The two side faces connect the upper side and the lower side together.

In the known method, in order to form a thermoplastic spacer, a strand which initially has pasty properties at a temperature which is above ambient temperature is extruded by means of a nozzle and applied to the glass plate in a manner such that the start and end of the strand are not blunt, but are abutted together via an inclined face (ramp) which is formed because, on being discharged from the nozzle at the start, over a section with a predetermined length, the thickness of the strand increases from zero to the nominal thickness of the strand and in complementary manner thereto, at the end of the strand, it is decreased over the same section from the nominal thickness to zero. This can be carried out with the aid of a nozzle with a variable discharge cross section and which also, while it is moved at a predetermined distance to the edge of the glass plate along the edge of the glass plate, can be lifted from the glass plate. Inevitably, this manner of operating produces a joint between the start and end of the strand. This joint is placed under pressure when assembling the insulating glass pane, because it is vitally necessary and usual to compress insulating glass panes, on the one hand in order to obtain the desired nominal thickness for the insulating glass pane, and on the other hand in order to ensure a firm connection which is sealed against the diffusion of water vapour between the spacer and the attached glass plates. During this compression, the two inclined faces at the start and end of the pasty strand are necessarily compressed together and bonded tightly together without taking further action, so that the frame-shaped spacer hermetically seals the interior space of the insulating glass pane, as is the intention. Upon cooling, the initially pasty strand consolidates and forms the intended spacer.

In the prepared insulating glass pane, the position of the interface between the start and the end of the strand on the side face of the strand facing the interior space of the insulating glass pane is still visible as a line running diagonally across this side face. Some people find this displeasing. The line which can be discerned on that side face of the strand which delimits the interior space of the insulating glass pane after it has been assembled marks the interface between the start and end of the strand lying in this section of the edge in this side face.

DE 10 2004 115 218 B3, which is not pre-published, discloses a method by means of which mechanical vibrations are applied to at least that side face of the pasty strand which, after assembling the insulating glass plate, delimits the interior space thereof, in a region which extends to either side of the edge of the interface between the start and the end of the strand, in particular by means of vibrating bodies which are placed in a contact-free manner at the side faces of the strand.

WO 2015/113080 A1 discloses a method for the production of spacers for insulating glass panes, in which a strand formed from thermoplastic material is applied as a spacer to a plate of glass and in which the start and end of the strand are connected together, wherein mutually overlapping ends of the strand are compressed between an inner jaw and an outer jaw. While the inner jaw and the outer jaw are placed against the strand, between them in the region of the connecting point between the start and end of the strand formed in this manner, a depression is produced by means of which, upon subsequent compression of the insulating glass plate to its nominal thickness, pressure equalization may be carried out. The depression for the pressure equalization is still visible after compression of the insulating glass pane to its nominal thickness. A subsequent treatment of this site with mechanical vibrations as taught in DE 10 2004 115 218 B3 is not possible, however, because the visible site is positioned in the insulating glass pane which has already been assembled.

The objective of the present invention is to indicate a manner by means of which a spacer of the type defined above can be produced, in which the position of the butt joint between the start and the end of the strand in the prepared insulating glass pane is more difficult to discern than before.

SUMMARY OF THE INVENTION

This objective is achieved by means of a method with the features of the independent patent claim. The subject matter of the dependent claims pertains to embodiments and further developments of the method in accordance with the invention.

In accordance with the invention, a pasty strand which has been applied to a glass plate in accordance with the method disclosed in DE 44 33 749 C2 in order to form a spacer is post-treated, wherein pressure alone is applied by means of and between a first jaw and a second jaw in a region which extends to either side of the edge of the interface between the start and the end of the strand, wherein at least the surface of the first jaw exerting pressure on the first side face of the strand which delimits the interior space of the insulating glass pane after assembly thereof has a property enabling the material of the strand which comes into contact with the surface of the first jaw to be removed therefrom by lifting the first jaw from the strand. In contrast to what is disclosed in DE 10 2014 115 218 B3, the strand is not post-treated by the application of mechanical vibrations, but rather, pressure jaws which face the side faces of the strand are merely moved towards each other in order to exert pressure on the strand, but in contrast to the teaching of DE 10 2014 115 218 B3, the pressure jaws are not vibrated. By applying pressure, in the side face of the strand which delimits the interior space after assembly of the insulating glass pane, the transition between the start and the end of the strand can be smoothed out in a manner such that the position of the interface between the start and the end of the strand in that side face which delimits the interior space of the insulating glass pane after assembly thereof, can no longer be discerned in the finished insulating glass pane, or is not as discernible as in the prior art. This is made possible because when the method in accordance with the invention is carried out, the insulating glass pane has not yet been assembled. In this regard, it is of no consequence whether the interface between the start and the end of the strand on the second side face of the strand facing outwards in the insulating glass pane and on the upper side and on the lower side of the strand which adhere to both glass panes in the insulating glass pane is still discernible, because these three sides are no longer visible after assembly and sealing of the insulating glass pane and/or after installation of the insulating glass pane in a window frame or door frame.

The method in accordance with the invention may be carried out in a production line for insulating glass panes, after the pasty strand has been applied to a first glass plate and before a second glass plate is pressed onto the frame-shaped strand which is formed thereby in order to complete the insulating glass pane. In this phase of the assembly of the insulating glass pane, the strand is still freely accessible on three sides, namely the first side face, which delimits the interior space of the insulating glass pane after the latter has been assembled, on its opposing second side face and the upper side of the strand applied to the first glass plate, which is subsequently joined to the second glass plate.

In the production line for insulating glass panes, the first glass plate with the frame-shaped strand adhering thereto may be moved away from the working area of the nozzle with which the strand has been extruded and applied to the glass plate to a station in which a tool is provided for post-treatment of the butt joint in the frame-shaped strand. The time taken for the post-treatment of the butt joint may be shorter than the time required for extrusion and application of the strand to the glass plate, so that the cycle time for the production line for the production of the insulating glass plate is not extended by the post-treatment. In general, the post-treatment may also, however, be carried out in the same station of the insulating glass pane production line in which the strand is extruded and applied to the glass plate.

The pressure may be exerted on the side faces of the strand in a variety of manners. In one embodiment of the invention, jaws are used in this regard which not only extend slightly beyond the section of the edge of the interface between the start and end of the strand in the side faces of the strand, but also cover a region of the side faces which extends to either side of the edge of the interface. In this regard, a surface of the jaws acting on the side faces of the strand may be in the shape of a rectangle with the length of its sides being determined by the height of the strand applied to the glass plate and by the length of the ramp measured in the longitudinal direction of the strand which marks the position of the interface between the start and end of the strand.

In another embodiment of the invention, the surface of the jaws which will act on the side faces of the strand are in the shape of a rhombus which is long enough to cover the edge of the interface in the relevant side face of the strand completely or almost completely. In this case, the jaws can be applied to the side faces of the strand in a manner such that the rhombus is essentially delimited by the upper side and the lower side of the strand as well as by two lines parallel to the edge of the interface and the edge of the interface essentially lies in the rhombus. This embodiment of the invention has the advantage that the region of the side face of the strand which is compressed can be minimized.

In a further embodiment of the invention, the surface of the first jaw acting on the first side face of the strand may be in the shape of a rhombus, while the second jaw acting on the second side face of the jaw may have a rectangular surface.

In a region which extends to either side of the interface between the start and the end of the strand, pressure may be exerted on the upper side of the strand using a die. This preferably occurs before pressure is exerted on the side faces of the strand for the first time. Exerting pressure on the upper side of the strand has the advantage that the thickness measured between the side faces of the strand becomes slightly greater as a consequence of the action of the die. After lifting the die from the upper side of the strand, the action of the jaws on both side faces of the strand means that their separation can be reduced to the original value. The material squeezed out thereby between the two jaws facilitates and favours smoothing of the side faces in the region of the interface between the start and the end of the strand.

The first jaw is preferably applied to the strand in a manner such that it does not come into contact with the glass plate. This ensures that the first jaw does not leave any traces on the glass plate; they could no longer be removed after assembly of the insulating glass pane. The second jaw may come into contact with the glass plate. Traces which it left on the glass plate would in fact not be visible in the finished and installed insulating glass pane.

The surface of the jaws that comes into contact with the strand should consist of a material or be coated with a material to which the pasty strand does not adhere or only adheres so weakly that the jaws can only deposit and/or pick up from the strand a non-negligible quantity of the material of the pasty strand. In this manner, the butt joint between the start and end of the strand can be made far less conspicuous. Examples of materials to which the material of the pasty strand do not adhere or only adhere to a slight extent which may be considered are fluoropolymers, for example polytetrafluoroethylene (PTFE), perfluoroalkoxyalkane (PFA), fluoroethylenepropylene (FEP), and also polyether-ether ketone (PEEK) and polysiloxanes.

Adhesion of the material from which the strand is formed to the jaws can not only be kept to a minimum by the selection of the material, but also by keeping the roughness of the surface of the jaws which comes into contact with the strand to within predetermined limits. In this regard, the surface of the jaws which comes into contact with the strand may have a mean roughness Ra in accordance with DIN EN ISO 4287:2010 of 0.5 µm to 2 µm, for example, in particular from 1 µm to 1.5 µm. In this manner, the contact surface between the surface of the jaw which comes into contact with the strand and the strand can be reduced and the non-stick action—also in combination with selection of the material as mentioned above—can be improved.

In a further embodiment of the method, jaws may be used which consist of a material or which are coated with a material with a thermal conductivity of no more than 0.3 Watt/(m·K). This ensures that the post-treatment of a thermoplastic strand in the region of its butt joint does not result in local cooling of the side faces of the strands concerned to such an extent that its smoothing could be compromised.

Preferably, at least those surfaces of the jaws and of any optional die which could come into contact with the strand are heated. This is primarily advantageous when the strand consists of a thermoplastic material or mainly of a thermoplastic material. Heating has the advantage that the temperature and therefore the viscosity of the strand, primarily at the surface which is to be smoothed, can be maintained in a region in which the material of the strand can be shaped readily by the jaws. The surfaces of the jaws and optionally of the die may be heated to that temperature at which the pasty strand was applied to the glass plate. In this state, the pasty strand can readily be shaped for the purposes of the invention. To this end, the surfaces of the jaws and optionally of the die may be heated to a temperature in the range from 80° C. to 130° C., in particular to a temperature of 120° C. to 130° C. This temperature range is particularly suitable for the case in which a material based on polyisobutylene, which is a thermoplastic, is used for the pasty and subsequently consolidating strand.

If the strand contains a curing component wherein curing is not accelerated by heating, then in this case, heating of the jaws and optionally of the die may again be advantageous. In cases in which the strand contains a heat-curable component, it is recommended that the post-treatment in accordance with the invention be carried out as soon as possible, when the strand is still sufficiently pasty.

The jaws should be applied to the side faces of the pasty strand with a pressure which is so low that the first jaw does not leave any indentations which would be visible to the naked eye on the side face which will subsequently delimit the interior space of the insulating glass pane. Particularly advantageously, the pressure is selected in a manner such that the first jaw only just leaves no visible indentation on the first side face of the strand. The type and temperature of the material used for the strand determines what this pressure is. The optimum can be determined by testing.

Whether the action of the jaw on the strand leaves a persistent indentation in it and also whether material is left behind on the jaw when the jaw is lifted from the strand is not only dependent on the pressure with which the jaws act on the strand, but also on the duration of the action. Thus, the pressure with which the jaws act on the strand and the duration of the action are coordinated in a manner such that at least the first jaw is free of residue and its removal from the strand does not leave an indentation on the first side face of the strand which is visible to the naked eye. The pressure with which the optional die is applied to the upper side of the strand may also be limited in a manner such that it is set to be at the shortest possible distance from the glass plate that the die can be set to. Similarly, the shortest separation of the two jaws from each other can be preset to the nominal thickness or almost the nominal thickness of the strand.

The jaws may be components of a gripper. The first jaw is applied to the first side face of the pasty strand at which the separating line between the start and end of the strand as a result of the post-treatment should no longer be visible or no longer be as visible to the naked eye. The second jaw may be placed on the glass plate and be applied to the second side face of the strand which will subsequently face outwards in the insulating glass pane. The gripper may have a closed position in which the two jaws lie parallel to each other and be at a separation that is identical to the nominal width of the strand. If the open gripper is initially placed with the second jaw on the glass plate and applied to the side face of the strand which will subsequently face outwards and if the gripper is only then closed by moving the first jaw up to the nominal width of the strand, then in a particularly simple manner, the position of the strand is unchanged following the post-treatment. Because the first jaw does not leave any traces on the glass plate, it may be that the edge facing the glass plate could be slightly retracted from the surface of the glass plate, i.e. by fractions of a millimetre, with respect to the other, second jaw placed on the glass plate. In this manner, the glass plate may be used as a reference for setting the position of the first jaw on the pasty strand.

Normally, with different glass plates—possibly apart from at the corners—the strand is always at an identical distance from the edge of the glass plate. This means that it is possible to use the edge of the glass plate as a reference for setting the position of the jaw on the strand, and when the jaws are components of a gripper, the second jaw can be preset by positioning it at the edge of the glass plate.

The edges of the surfaces of the jaws and optional die acting on the side faces of the strand may be rounded. This is advantageous in order to prevent traces which are visible to the naked eye from being left on the strand, in particular on the first side face of the strand.

The surface of the first jaw by means of which pressure is applied to the first side face of the strand may have a contour and preferably has a contour which matches the given contour of the first side face of the strand. This further facilitates the solution to the problem of reducing or removing the visibility of the position of the butt joint between the start and the end of the strand in the first side face of the strand. Preferably, the contour of the surfaces of the second jaw and the optionally provided die are also matched to the given contour of the second side face of the strand or respectively the given contour of the upper side of the strand.

The two jaws may initially be disposed such that—with respect to the longitudinal extent of the strand—the center of their surfaces which are to be placed on the side faces of the strand lies in the center of the region over which the interface between the start and the end of the strand extends, and in that the jaws act a first time in this position with pressure on the two side faces of the strand, in that afterwards, the jaws are lifted from the strand and displaced a little further along the strand in one direction and in the position obtained by the displacement, pressure is again applied to the side faces of the strand, in that subsequently, the jaws are displaced in the opposite direction a little further along the strand over and past the center of the region over which the interface between the start and the end of the strand extends and in the position attained by the second displacement, act again on the side faces of the strand. In this manner, the offset is selected each time in a manner such that the surface regions of the strand on which the displaced jaws act overlap with the central region of the strand in which its side faces were first acted upon. This procedure has the advantage that—if, despite everything, a small indentation remains on the first side face of the strand—it will be less discernible or even no longer discernible with the naked eye. To achieve this, particularly advantageously, the action on the side faces of the strand with jaws which are displaced with respect to the central position is repeated at least one more time, wherein the magnitude of the offset with respect to the initial central position of the jaws can then be equal to or different from the preceding offset.

Advantageously, the time during which the pressure is exerted on the side face of the strand is no longer than 1 second in each case. If pressure is exerted again on the side faces of the strand, advantageously, the duration for times subsequent to the first time during which the pressure is exerted is shorter than when the pressure is exerted on the side faces of the strand for the first time.

The invention is suitable both for the manufacture of rectangular insulating glass panes and also for the manufacture of shaped panes. Shaped panes are insulating glass panes with a contour that differs from the rectangular shape. The procedure during the manufacture of shaped panes may be such that the position at which the start and end of the strand butt together lies in a linear section of the strand. This procedure means that the post-treatment of the butt joint is easier to carry out than if it were in a curved section of the spacer. The post-treatment may, however, also be carried out when the butt joint lies at a corner of the applied frame-shaped strand, and might even extend beyond the corner. This has the advantage that the butt joint may be found at a position on the insulating glass pane at which it is less conspicuous than in a linear section of the edge of the insulating glass pane.

BRIEF DESCRIPTION OF THE DRAWINGS

The accompanying drawings serve to further illustrate the invention.

DETAILED DESCRIPTION OF THE PREFERRED EMBODIMENTS

Figure 1:
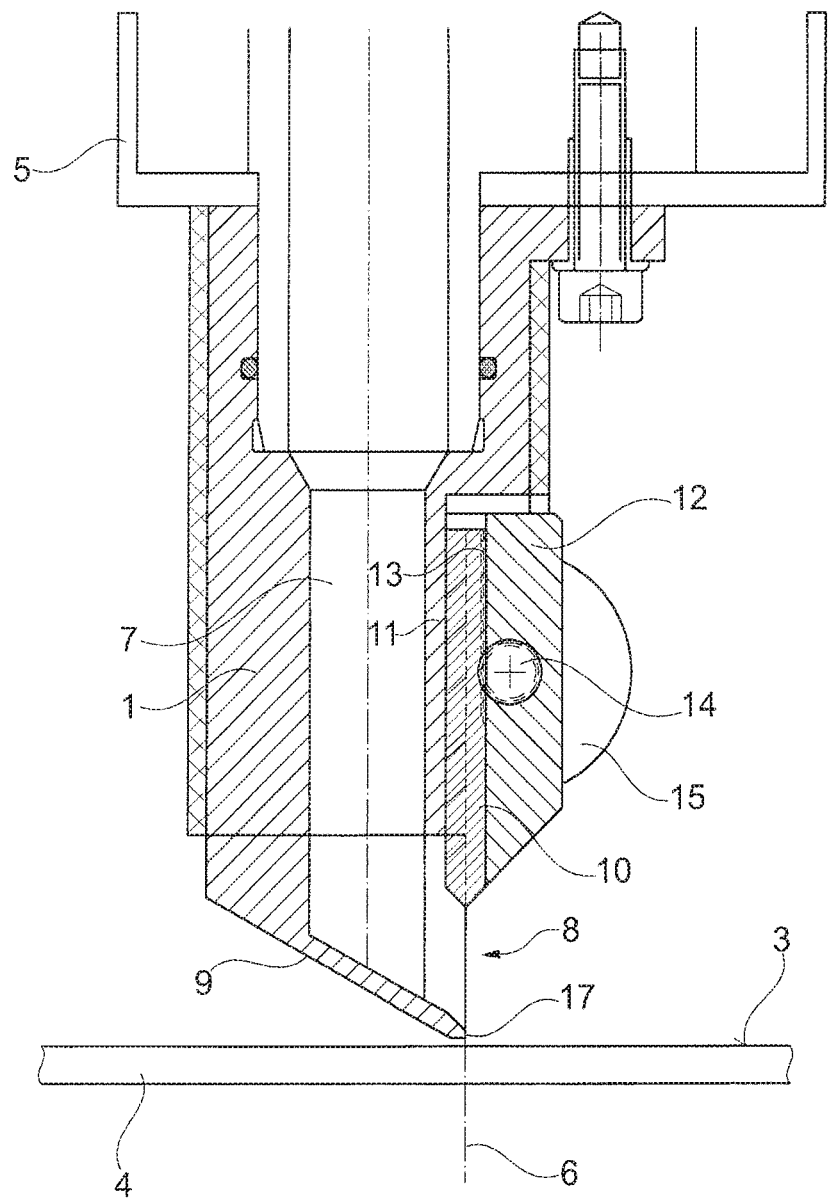
FIG. 1 shows a nozzle which is suitable for applying a pasty strand to a glass plate.

The nozzle 1 shown in FIGS. 1 to 5 for applying a pasty strand 2 to the surface 3 of a glass plate 4 is attached to the end of a shaft 5 which is rotatable about a rotational axis 6 which is perpendicular to the surface 3 of the glass plate 4. The shaft 5 is hollow in configuration and opens into a channel 7 which passes through the nozzle 1 and leads to a discharge opening 8 of the nozzle 1. The nozzle 1 has an end face 9 which in its working position is inclined to the surface 3 of the glass plate 4 and directly borders the discharge opening 8 which is perpendicular to the surface 3 of the glass plate 4. The discharge opening 8 has an essentially rectangular outline. The rotational axis 6 of the shaft 5 runs through the center of the discharge opening 8.

The hollow shaft 5 serves to rotate the nozzle 1 about its rotational axis 6 as well as to supply, to the nozzle 1, the pasty mass which is to be applied to the glass plate 4. A slide valve 10 is provided in order to close the discharge opening 8; it is interchangeable and disposed between a wall 11 of the channel 7 which is disposed parallel to the rotational axis 6 and a removable counter-holder 12. The slide valve 10 is guided in displacement parallel to the rotational axis 6 between the wall 11 and the counter-holder 12. In order to be able to displace it, it is provided with a rack 13 which engages with a pinion 14 which can be controlled and driven by a small electric motor 15 mounted on the shaft 5.

Figure 2:
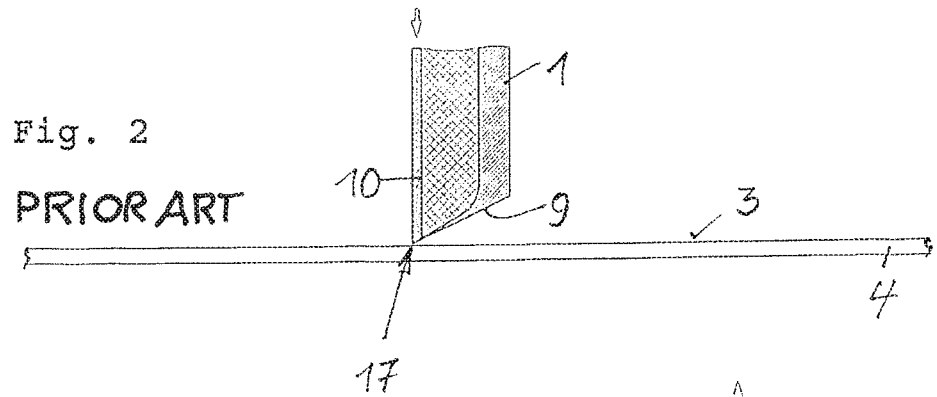
FIG. 2 shows the nozzle in the first of four successive phases of applying a pasty strand to the glass plate.
Figure 3:
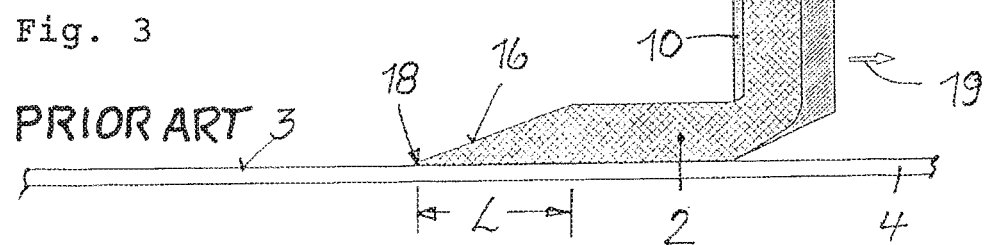
FIG. 3 shows the nozzle in another successive phase of applying a pasty strand to the glass plate in furtherance of FIG. 2.
Figure 4:
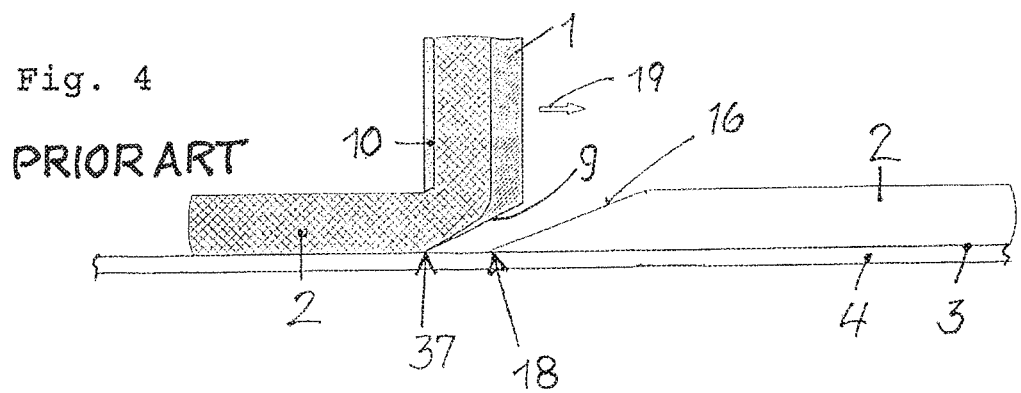
FIG. 4 shows the nozzle in another successive phase of applying a pasty strand to the glass plate in furtherance of FIG. 3.

In order to apply a pasty strand to the surface 3 of the glass plate 4, the nozzle 1 is initially brought close to the surface 3 of the glass plate 4 in the direction of the rotational axis 6 until the nozzle 1 comes into contact with the surface 3 of the glass plate 4 or almost comes into contact with it. During this, the discharge opening 8 of the nozzle is initially closed by the slide valve 10. This situation is shown in FIG. 2.

The nozzle 1 is then moved along the edge of the glass plate 4, wherein the distance of the nozzle 1 from the edge of the glass plate 4 is kept as uniform as possible. The nozzle 1 may in this manner be moved along the edge of the glass plate 4, either by moving the nozzle 1 and keeping the glass plate 4 stationary or by moving the glass plate 4 and keeping the nozzle 1 stationary, or by moving both the nozzle 1 and the glass plate 4 in a coordinated manner. The movement of the nozzle 1 relative to the glass plate 4 is made in a direction which is opposite to the discharge opening 8 of the nozzle 1.

In the start phase of the movement over a section with length L (see FIG. 3), the slide valve 10 is steadily opened until it reaches a predetermined position in which the strand 2 dispensed from the nozzle 1 has its nominal thickness D. Because the slide valve 10 is opened steadily, in the start phase on the section with length L, the strand 2 has a steadily increasing thickness so that the upper side of the strand 2 here has an inclined face 16 which provides the first section of the strand 2 with the shape of a ramp which is inclined upwards, with length L.

Figure 5:
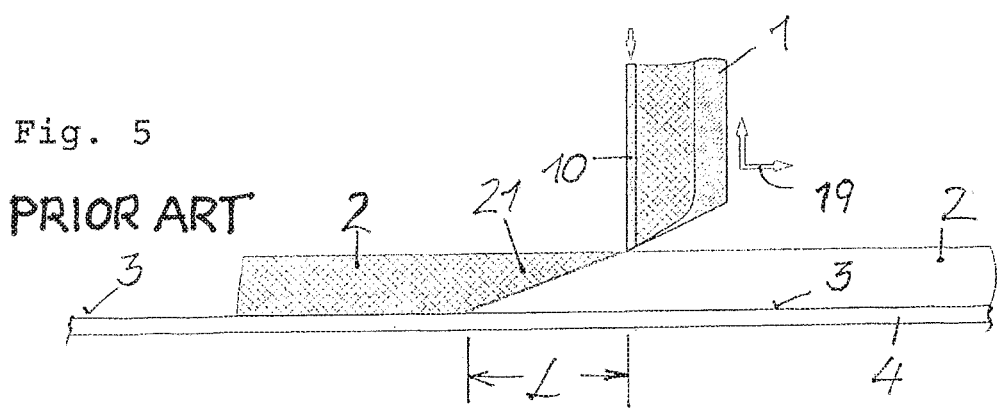
FIG. 5 shows the nozzle in another successive phase of applying a pasty strand to the glass plate in furtherance of FIG. 4.

The nozzle 1 is moved around the glass plate 4 parallel to the surface 3 of the glass plate 4 at the edge thereof, depositing thereby a strand 2 with an essentially uniform cross section and uniform thickness D on the glass plate 4, to which the strand 2 adheres. Finally, the nozzle 1 comes back to the ramp 16, see FIG. 4. It continues its movement unchanged relative to the glass plate 4, until finally its lower edge 17 reaches the tip 18 of the start section of the strand 2. Because of the inclined profile of the lower end face 9 of the nozzle, the angle of which can be selected to be somewhat greater than the angle between the surface 3 of the glass plate 4 and the upper surface of the ramp 16, planar contact does not occur between the lower end face 9 of the nozzle 1 and the ramp 16. As the movement of the nozzle 1 relative to the glass plate 4 continues in the direction of the arrow 19, the nozzle 1 is now lifted up in a controlled manner from the glass plate 4, so that its lower edge 17 moves along the upper side of the ramp 16. Simultaneously and synchronously therewith, the slide valve 10 is steadily advanced in the direction of its closed position; it reaches its closed position when the lower edge 17 of the nozzle 1 has reached the upper end 20 of the ramp 16. This status is shown in FIG. 5.

In this manner, a wedge-shaped end section 21 of the strand is formed, which is configured in complementary manner to the ramp 16 and rests on the ramp 16 so that the strand 2 forms a closed frame which adheres to the glass plate 4 the edge of which lies externally of the frame.

The wedge-shaped end section 21 may be applied to the ramp 16 in a manner such that here, the strand 2 is slightly thicker than the nominal thickness D of the strand 2. This facilitates obtaining a particularly reliable and tight bond between the ramp 16 and the wedge-shaped end section 21 upon subsequent compression of the insulating glass pane. This surplus thickness can readily be obtained by not starting the closing movement of the slide valve 10 when reaching the ramp 16 until the lower edge 17 of the nozzle 1 has already passed over the tip 18 of the starting section of the strand 2 (the start of the ramp 16) by a short distance which is small compared with the length L of the ramp 16.

The edge 22 of the interface between the start and the end of the strand 2, i.e. between the edge 16 and the wedge-shaped end section 21 of the strand 2, is initially easy to see. This visibility is reduced or completely removed by applying the invention.

Figure 6:
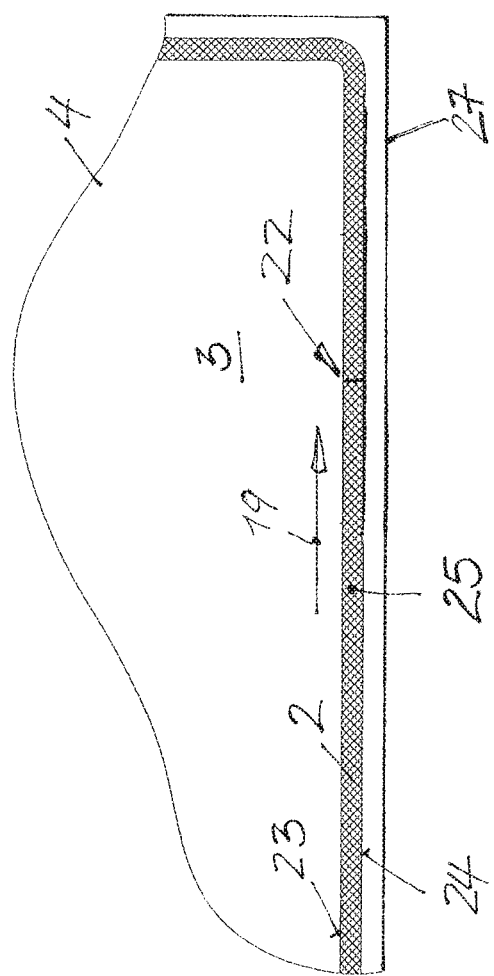
FIG. 6 shows a portion of the glass plate with an applied pasty strand, in top view.

FIG. 6 shows a portion of the glass plate 4 with a strand 2 applied thereto, in top view. The strand 2 lying on the glass plate 4 runs parallel to the edge 27 of the glass plate 24 and has a first side face 23, which in the subsequent insulating glass pane faces the interior space of the insulating glass pane, and has a second side face 24 which faces outwards. The side of the strand 2 facing the observer in FIG. 6 is denoted its upper side 25 here; the side of the strand 2 lying on the glass plate 4 is termed its lower side 26. The edge 22 of the interface between the start and end of the strand 2 is seen in FIG. 6 as a line which is perpendicular to the two side faces 23 and 24. The arrow 19 indicates the longitudinal direction of the strand 2 in which the nozzle 1 is moved relative to the glass plate 4.

Figure 7:
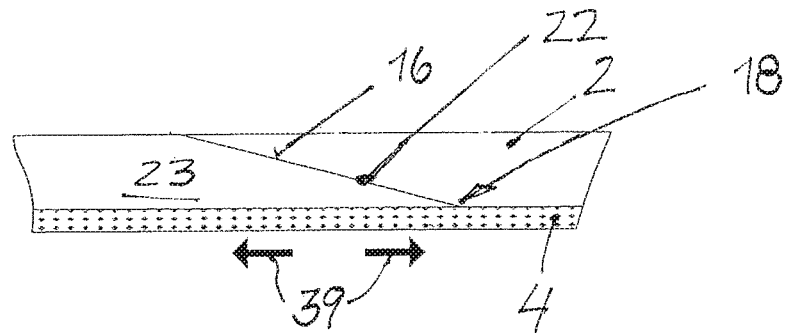
FIG. 7 shows a cross section through a portion of the glass plate with a side view of the pasty strand in the region of the butt joint between the start and end of the strand.
Figure 8:
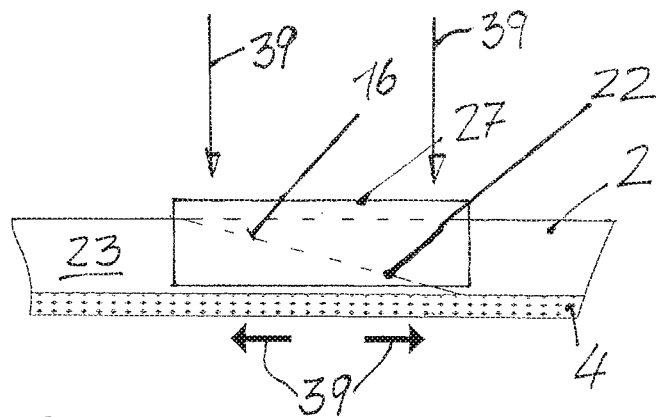
FIG. 8 shows the view of FIG. 7, supplemented by the outline of a rectangular jaw.
Figure 9:
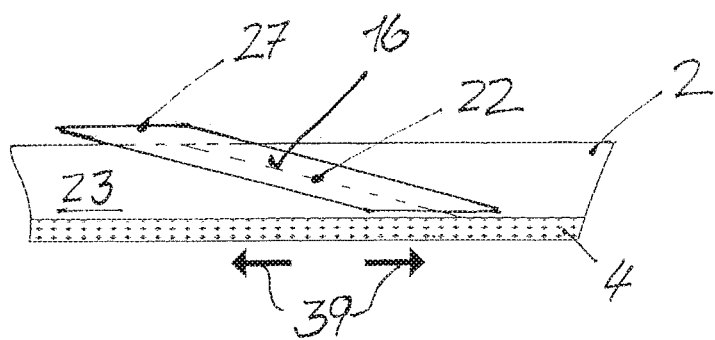
FIG. 9 shows the view of FIG. 7, supplemented by the outline of a rhomboid jaw.

FIG. 7 shows a cross section through a portion of the glass plate 4 with a view of the first side face 23 of the strand 2, on which the edge 22 of the interface between the ramp 16 and the wedge-shaped end section 21 of the strand 2 running obliquely to the surface 3 of the glass plate 4 can be seen. In order to reduce the discernibility of this edge 22 or to remove it, a jaw 35 is applied to this edge 22 and to an adjacent region of the first side face 23 of the strand on either side of the edge 22, which jaw 35 is pressed onto the edge 22, completely or partially covering the side face 23, at least once, preferably repeatedly. The jaw 35 may lie flush against the side face 23 and its surface acting on the side face 23 may have a rectangular outline, as shown in FIG. 8; it may also have a rhomboidal outline, as shown in FIG. 9. The latter has the advantage that the contact surface between the jaw 35 and the side face 23 of the strand 2 can be minimized. In both cases, the jaw 35 may maintain a small distance from the surface 3 of the glass plate 4, so that it cannot leave any traces on the surface 3 of the glass plate 4.

Merely for safety reasons, a second jaw 36 is placed opposite to the jaw 35 and is applied to the second side face 24 of the strand 2 and acts as an abutment, preventing the first jaw 35 from displacing the strand 2 in the region of the connecting point between the start and the end of the strand 2 from its nominal position outwardly in the direction of the nearby edge 27 of the glass plate 4.

The surfaces of the two jaws 35 and 36 which act on the strand 2 should have a property that enables the jaws 35 and 36 to be removed from the strand 2 without substantial residues of the preferably thermoplastic material from which the strand 2 consists, at least at its surface, remaining adhered to the jaws 35 and 36. With the first jaw 35, which acts on the first side face 23 of the strand 2, which lies internally in the finished insulating glass pane, residues which originated from the first side face 23 of the edge 2 and which could leave traces which were easily visible to the naked eye could be substantial and therefore would be undesirable. On the opposite side face 24 of the strand 2, the requirements are less strict, because in the finished and installed insulating glass pane, the side face 24 is no longer visible. Examples of materials to which hot thermoplastic masses based on a polyisobutylene, which are in routine use to seal insulating glass panes, do not adhere or adhere poorly are polytetrafluoroethylene (PTFE), perfluoroalkoxyalkane (PFA), fluoroethylenepropylene (FEP), polyether-ether ketone (PEEK) and polysiloxanes.

When the strand 2 has consolidated, the connecting point between the start and the end of the strand 2 can no longer be smoothed, and thus the connecting point can no longer be made less conspicuous or no longer discernible to the naked eye. Thus, preferably, the surface of the jaw is heated to a temperature at which the material from which the strand consists can still be shaped plastically; with a material based on a polyisobutylene, for example to a temperature in the range from 80° C. to 130° C., in particular to a temperature of 120° C. to 130° C. A temperature at which the material from which the strand 2 is formed is pumped to the nozzle 1 is particularly suitable.

Preferably, a die 38 is additionally provided, which can press in the direction of the arrow 37 on the upper side of the strand 2 before the two jaws 35 and 36 are pressed onto the side faces 23 and 24. This has the advantage that the two side faces 23 and 24 can initially bulge outwards somewhat and in this manner, surplus material is present at the side faces 23 and 24 which is squeezed out when, after lifting the die 38, the two jaws 35 and 36 press onto the side faces 23 and 24 of the strand 2 and close together up to the nominal width of the strand 2. The squeezing process that occurs here reduces or removes the visibility of the connecting point between the start and end of the strand 2.

Particularly preferably, the method has the following steps:

The two jaws 35, 36 may initially be disposed such that—with respect to the longitudinal extent of the strand 2—the center of their surfaces which are to be placed on the side faces 23, 24 of the strand 2 lies in the center of the region over which the interface between the start and the end of the strand 2 extends, and in that the jaws 35, 36 act a first time in this position with pressure on the two side faces 23, 24 of the strand 2 after earlier, the die 38 has been pressed onto the upper side 25 of the strand 2, in that afterwards, the jaws 35, 36 are lifted from the strand 2 and displaced a little further along the strand in one direction, and in the position obtained by the displacement, pressure is again applied to the side faces 23, 24 of the strand 2, in that subsequently, the jaws 35, 36 are displaced in the opposite direction a little further along the strand 2 over and past the center of the region over which the interface between the start and the end of the strand 2 extends and in the position attained by the second displacement, act again on the side faces of the strand. In this manner, the offset is selected each time in a manner such that the surface regions of the strand 2 on which the displaced jaws 35, 36 act overlap with the central region of the strand 2 in which its side faces 23, 24 were first acted upon. This procedure has the advantage that—if, despite everything, a small indentation remains on the first side face 23 of the strand 2—it will be less discernible or even no longer discernible with the naked eye. To achieve this, particularly preferably, the action on the side faces 23, 24 of the strand 2 with jaws 35, 36 which are displaced with respect to the central position is repeated at least one more time, wherein the magnitude of the offset with respect to the initial central position of the jaws 35, 36 then can equal to or different from the preceding offset.

Figure 10:
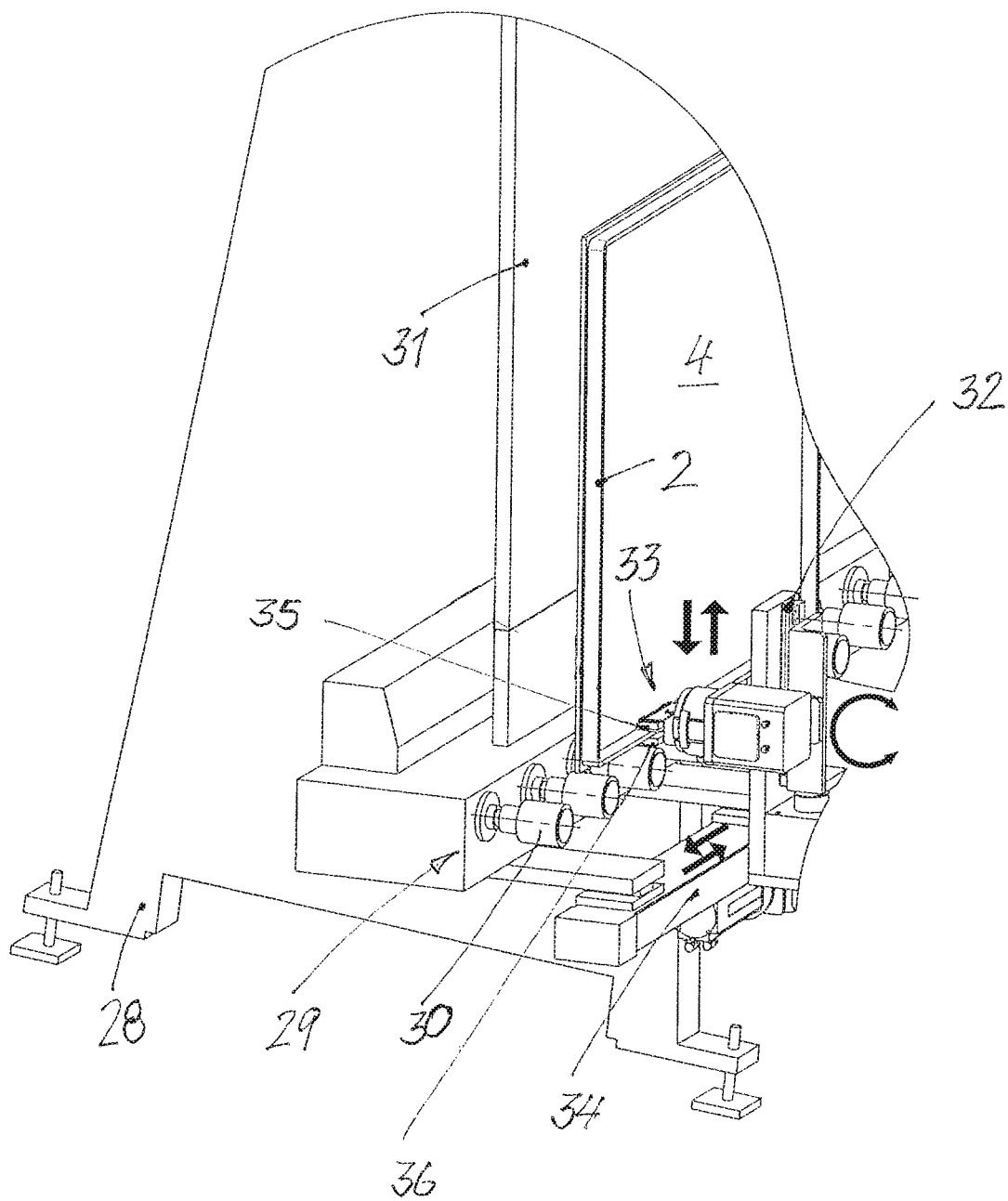
FIG. 10 shows a section of a production line for insulating glass panes in an isometric view, with a gripper which comprises the two jaws.

FIG. 10 shows a section of a production line for insulating glass panes with a frame 28, which carries a horizontal conveyor 29 with a series of synchronously operable conveyor rollers 30 as well as a support wall 31, on which glass plates 4 standing on the conveyor rollers 30 can be supported. In the example shown in FIG. 10, a glass plate 4 can be seen onto which a frame-shaped spacer has been applied which—as described above—is formed by a pasty strand 2. This may be a strand 2 formed from a thermoplastic material, for example based on a polyisobutylene. A rail 32 is attached to the frame 28 and extends from bottom to top parallel to the support wall 31 and onto which a gripper 33 is attached for movement up and down, has a variable distance from the support wall 31 and is pivotably mounted about an axis running perpendicular to the support wall 31. The rail 32 may be mounted in a stationary manner on the frame 28, however it may also be displaceably mounted parallel to the horizontal conveyor 29 on a horizontal crossbeam 34 of the frame 28.

The gripper 33 has a pair of jaws 35 and 36 which may have parallel facing surfaces which can move together, or it may have a contour which is matched to the side faces 23 and 24 of the strand 2 and their mutual separation can be varied between an open position and a closed position. In the closed position shown in FIG. 10, the jaws 35 and 36 can apply pressure to the two side faces 23 and 24 of the strand 2. In the open position, the jaws 35 and 36 release the strand 2.

Figure 11:
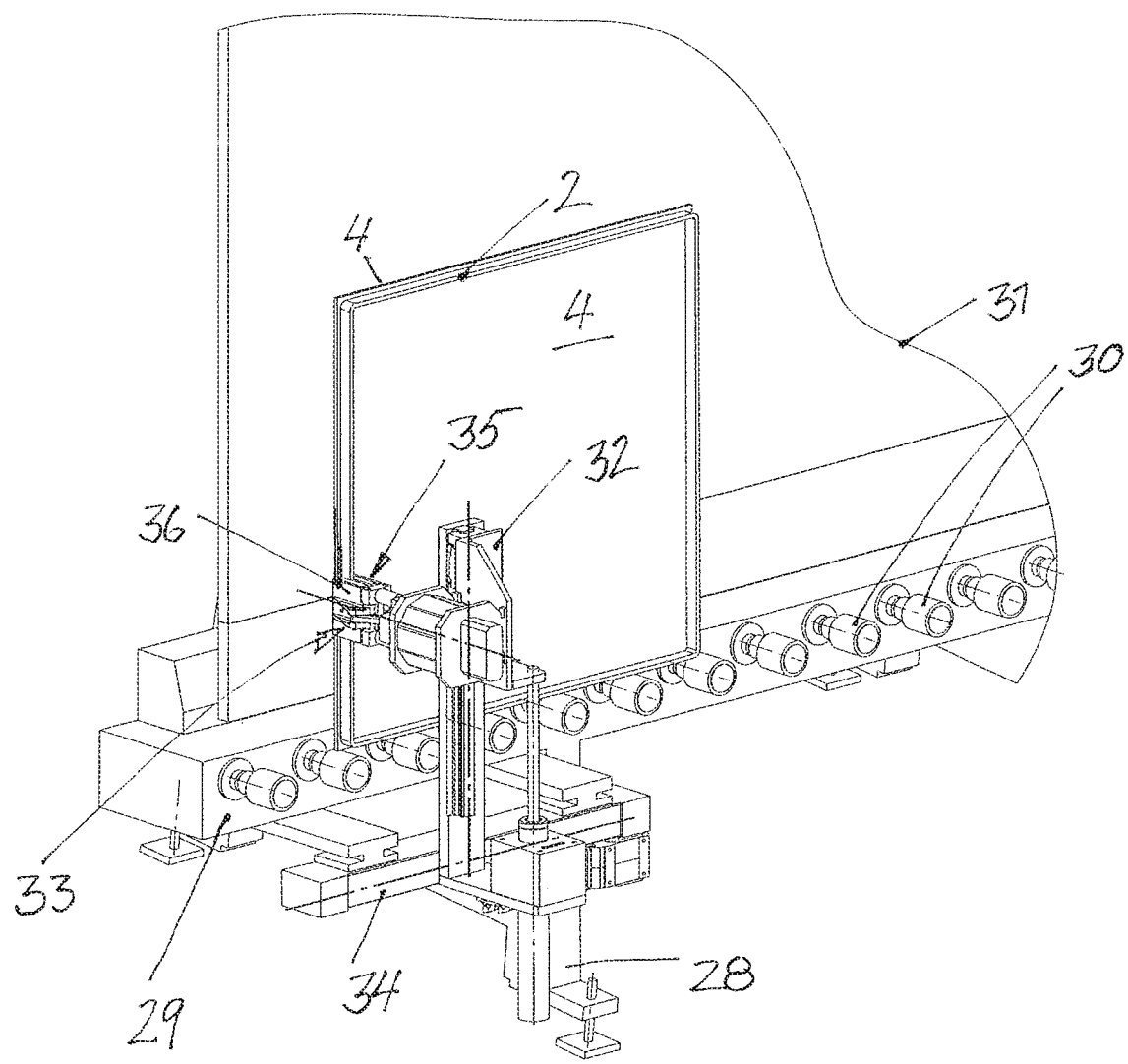
FIG. 11 shows a view of a production line for insulating glass panes as in FIG. 10, but from another perspective and with the gripper in a different position on a rectangular glass plate.
Figure 12:
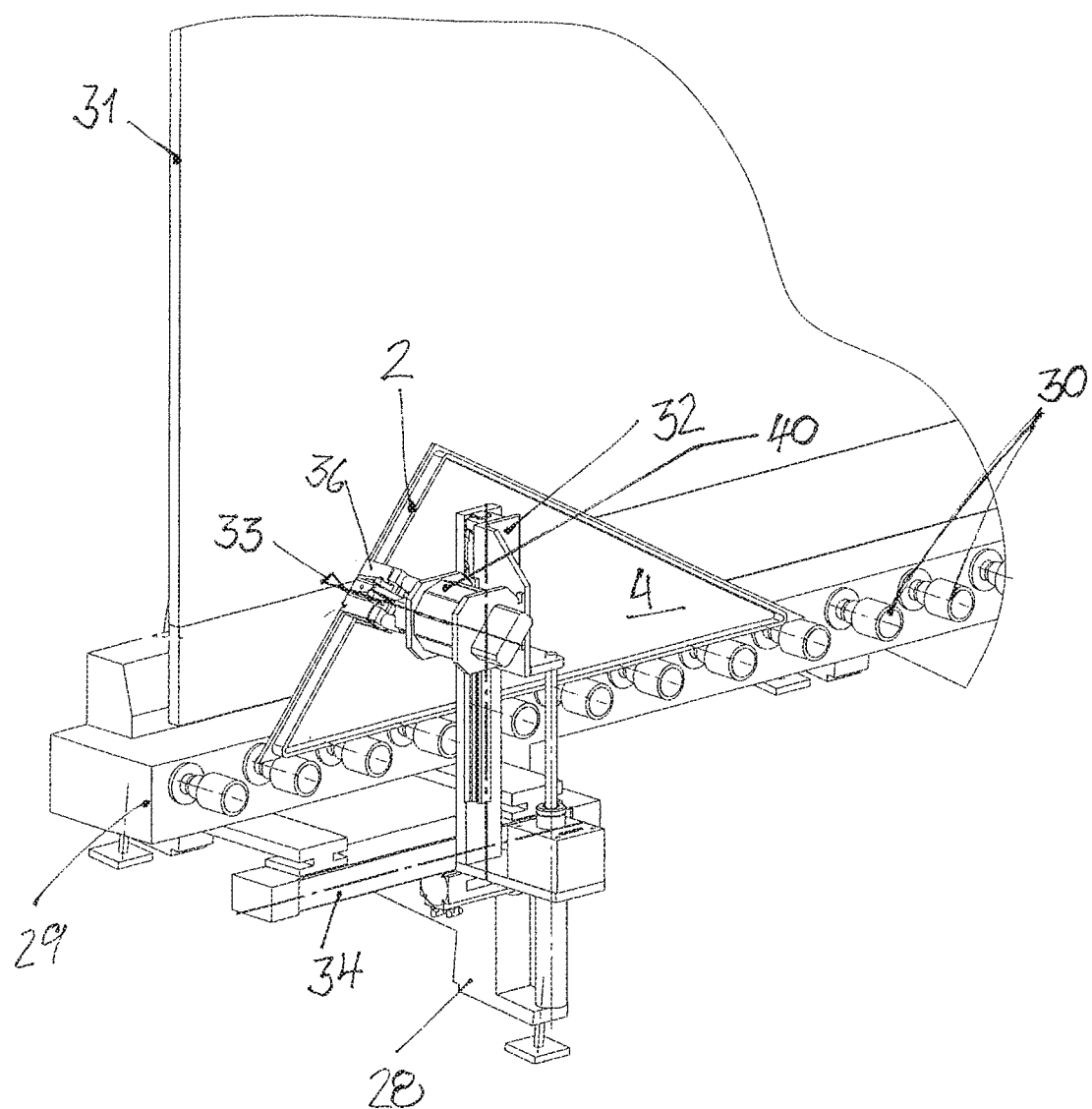
FIG. 12 shows the section of the production line as shown in FIG. 11, but with the gripper in a position at the edge of a triangular glass plate.
Figure 13:
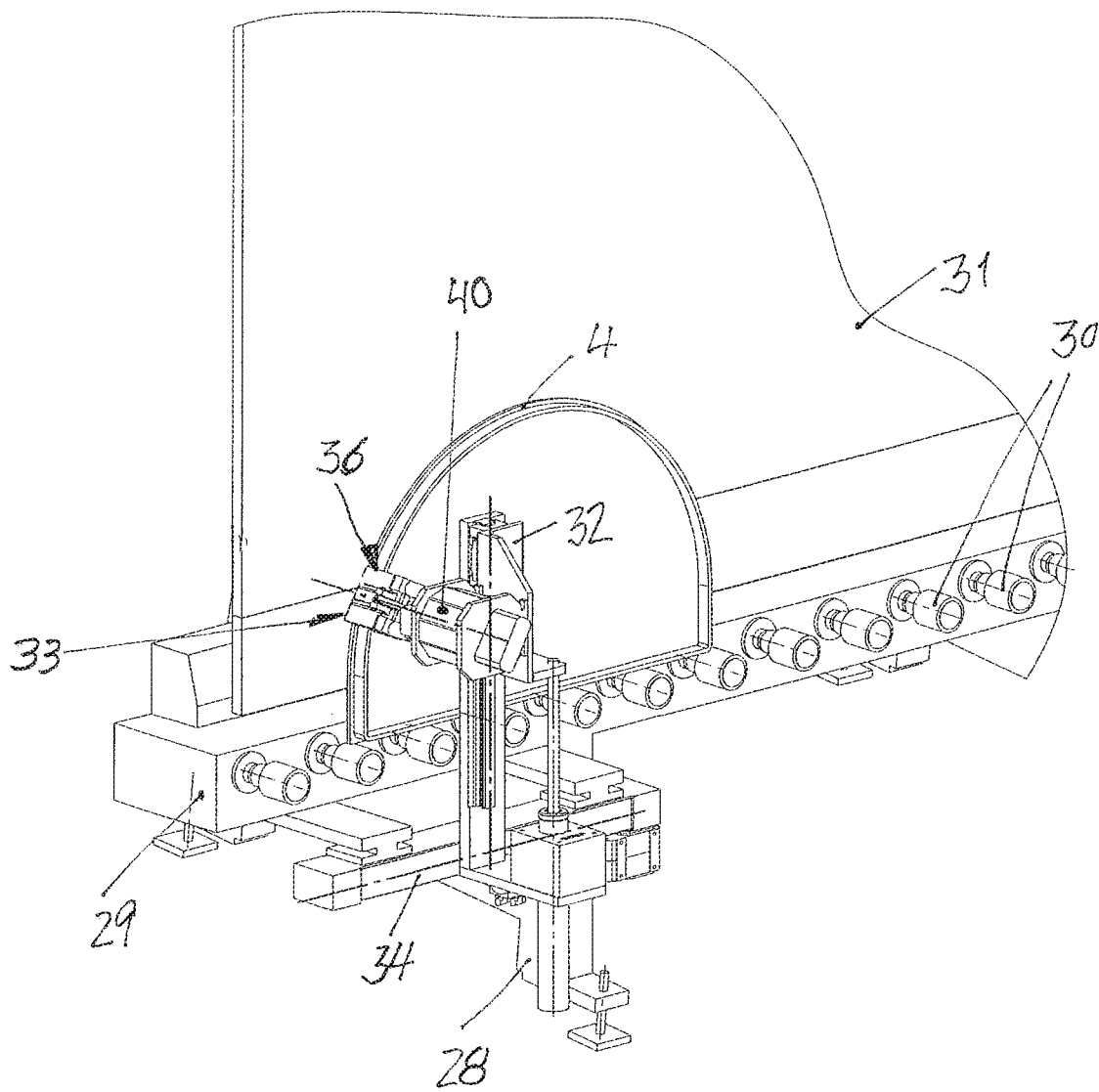
FIG. 13 shows the section of the production line as shown in FIG. 11, but with the gripper in a position at the edge of a semi-circular glass plate.

The glass plate 4 and the gripper 33 are positioned relative to each other in a manner such that the jaws 35 and 36 of the gripper 33 cover the side faces 23 and 24 of the strand 2 at the position where the start and end of the strand 2 meet. For a rectangular glass plate 4, as shown in FIG. 10, this position is advantageously always on the lower horizontal edge of the glass plate; however, as shown in FIG. 11, it may be on an upright edge of the glass plate or, as shown in FIGS. 12 and 13, for a glass plate 4 for the production of a shaped pane with an outline that differs from a rectangular shape, somewhere in a position along the edge of the glass plate 4 which is above the lower edge of the glass plate 4. The described way of mounting the gripper 33 on the frame 22 with the possibility of moving it up and down as well as backwards and forwards and horizontally to and fro and of pivoting it about an axis which is perpendicular to the supporting wall 31, means that it is possible to place the butt joint between the start and end of the strand 2 anywhere and to post-treat it in accordance with the invention.

Figure 14:
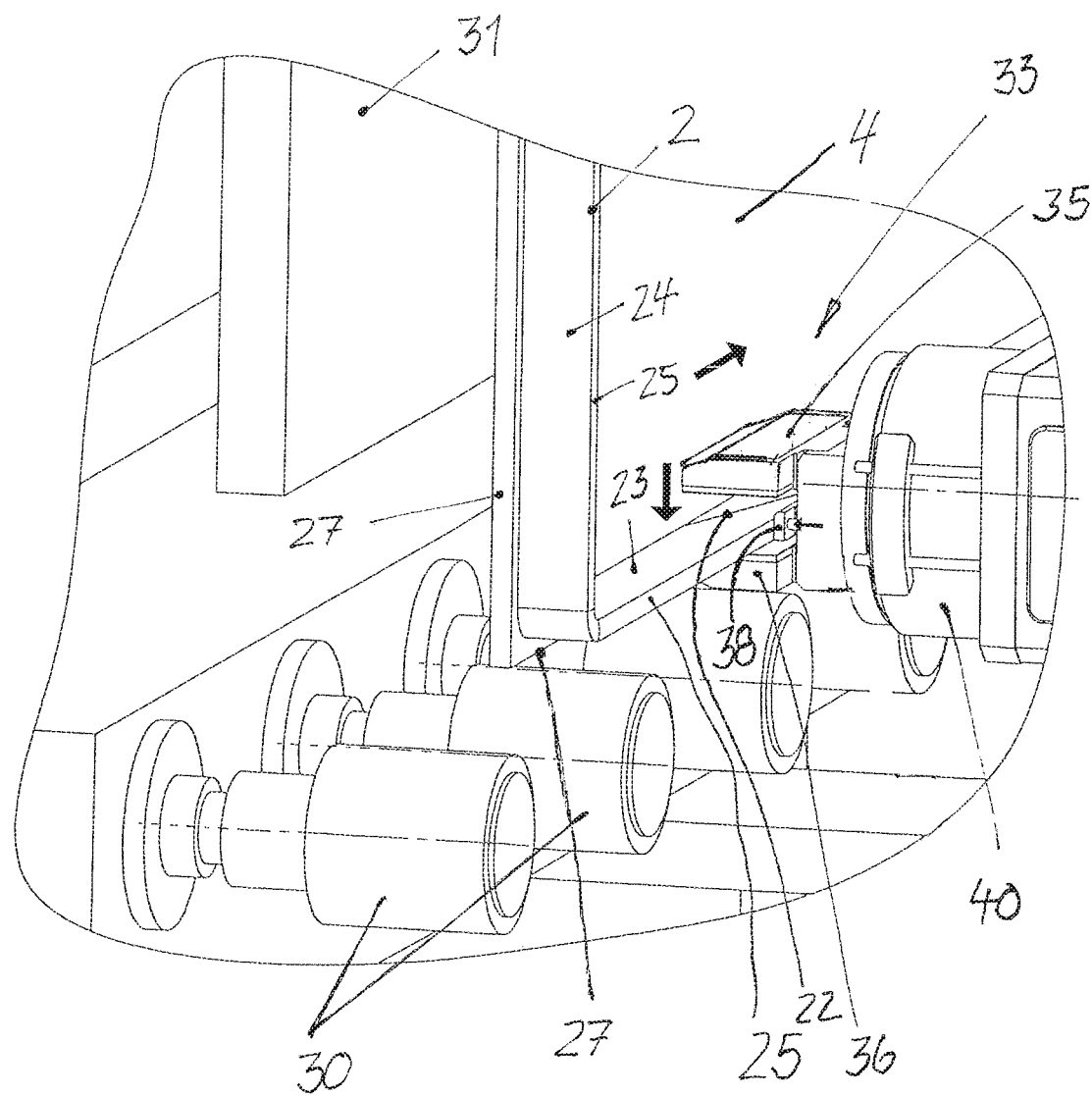
FIG. 14 shows an enlarged section from FIG. 10, with the gripper in its open position.

FIG. 14 shows an enlarged section of the equipment shown in FIG. 10 with the gripper 33 open. The jaws 35 and 36 are in the open position and parallel to each other and further apart than in the closed position. By pushing the gripper 33 forwards against the glass plate 4, the jaws 35 and 36 are in a position in which they only have to be moved towards each other. The lower, second jaw 36 makes contact with the surface 3 of the glass plate 4, but the upper, first jaw 35 does not. A die 38 is placed on the upper side 25 of the strand 2 and is pushed forwards between the two jaws 35 and 36 out of the gripper body 40, and thus is brought to sit on the upper side 25 of the strand 2; before closing the gripper 33, it can compress the strand 2 and thereby make the action of the jaws 35 and 36 on the side faces 24 and 25 of the strand more effective.

By reducing the separation of the two jaws 35 and 36 between each other, they come to lie on the side faces 23 and 24 of the strand 2 and then cover the edge 22 of the interface lying between the start and end of the strand 2.

Figure 15:
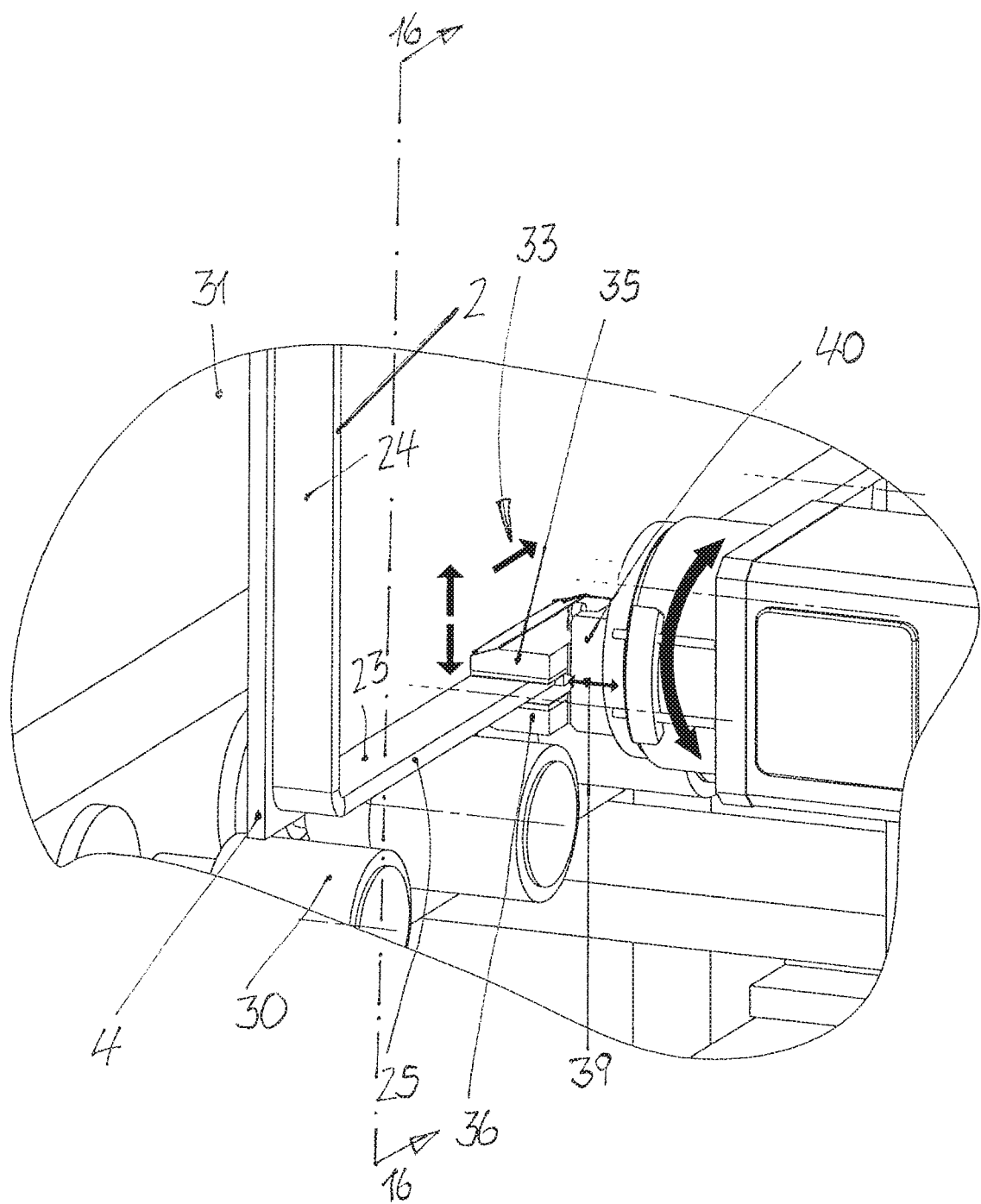
FIG. 15 shows an enlarged section from FIG. 10, with the gripper in its closed position.
Figure 16:
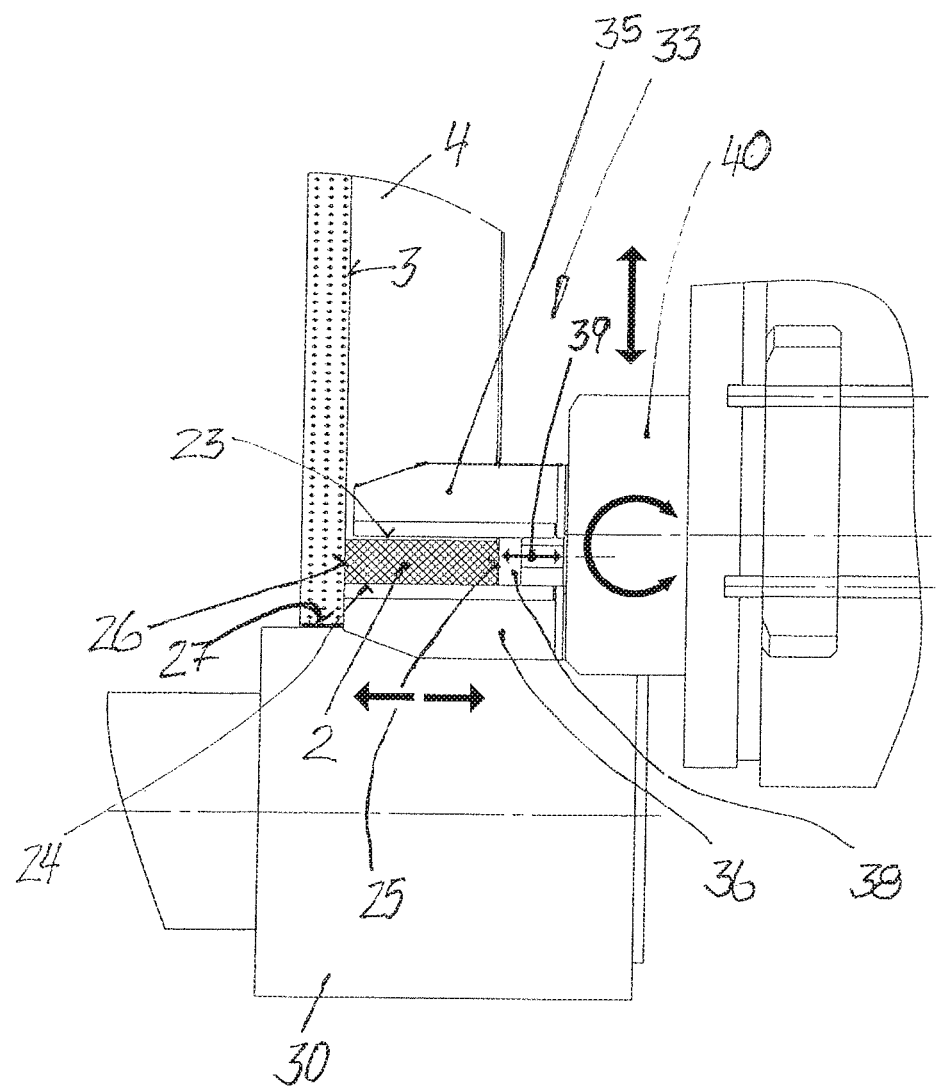
FIG. 16 shows a vertical section through the device of FIG. 15 along the sectional line 16-16.

The closed position of the gripper 33 is shown in FIGS. 15 and 16. FIG. 16 clearly shows that the lower jaw 36 can come into contact with the glass plate 4 while the upper jaws 35 maintains a small distance from the surface 3 of the glass plate 4. The die 38 is between the two jaws 35 and 36 and comes into contact with the upper side 25 of the strand 2, preferably before the two jaws 35 and 36 act upon the side faces 23 and 24 of the strand 2. After completing the application of pressure to the strand 2, the gripper 33 is opened again and withdrawn from the glass plate 4 so that the glass plate 4 with the frame-shaped spacer formed by the strand 2 adhering to it can be conveyed away on the horizontal conveyor 29 without the projecting section of the strand 2 colliding with the gripper 33. Preferably, however, the glass plate is only conveyed after the jaws 35 and 36 have acted on a plurality of mutually offset and mutually overlapping sections. In this regard, either the gripper 33 can be displaced relative to the stationary glass plate 4, or the glass plate 4 can be displaced relative to the stationary gripper.

| List of reference signs | |
|---|---|
| 1 | nozzle |
| 2 | pasty strand |
| 3 | surface of 4 |
| 4 | glass plate |
| 5 | hollow shaft |
| 6 | rotational axis |
| 7 | channel |
| 8 | discharge opening |
| 9 | end face |
| 10 | slide valve |
| 11 | wall |
| 12 | couner-holder |
| 13 | rack |
| 14 | pinion |
| 15 | electric motor |
| 16 | inclined face, ramp |
| 17 | lower edge of 1 |
| 18 | tip of start section of 2 |
| 19 | arrow shows the movement of the nozzle in the longitudinal direction of the strand |
| 20 | upper end of 16 |
| 21 | wedge-shaped end section of 2 |
| 22 | edge of interface between 16 and 21 |

-continued

| List of reference signs | |
|---|---|
| 23 | first side face of 2 |
| 24 | second side face of 2 |
| 25 | upper side |
| 26 | lower side |
| 27 | edge of glass plate 4 |
| 28 | frame |
| 29 | horizontal conveyor |
| 30 | conveyor rollers |
| 31 | support wall |
| 32 | rail |
| 33 | gripper |
| 34 | crossbeam |
| 35 | jaw |
| 36 | jaw |
| 37 | arrow |
| 38 | die |
| 39 | arrow |
| 40 | gripper body |
| B | nominal width of strand 2 |
| D | nominal thickness of strand 2 |
| L | length of ramp 16 |

What is claimed is:

1. A method for forming a closed frame-shaped spacer for an insulating glass pane, the method comprising the steps of:
applying an initially pasty strand, which subsequently consolidates, delimited by a lower side, an upper side, a first side face and a second side face, and which has a thickness D between the lower side and the upper side as well as a width B between the two side faces, onto a glass plate along an edge of the glass plate in a manner wherein at a start of the strand, its thickness comprises a ramp over a section with length L, wherein the thickness of the strand increases from zero to the thickness D, and at an end of the strand, said thickness decreases from the thickness D to zero in a manner which is complementary to the increasing ramp over the same section L, overlapping the ramp, so that a surface of the ramp forms an interface between the start and the end of the strand;
post-treating the pasty strand at both of its side faces by merely applying pressure between a first jaw and a second jaw in a region which extends to either side of an edge of the interface between the start and the end of the strand, wherein at least a surface of the first jaw exerting pressure on the first side face of the strand which delimits an interior space of the insulating glass pane after assembly thereof has a property enabling the first side face of the strand which comes into contact with the surface of the first jaw to be removed therefrom by lifting the first jaw from the strand.

2. The method as claimed in claim 1, wherein the surfaces of the jaws facing the strand consist of polytetrafluoroethylene (PTFE), perfluoroalkoxyalkane (PFA), fluoroethylenepropylene (FEP), a polysiloxane or a polyether-ether ketone (PEEK).

3. The method as claimed in claim 1, wherein the surfaces of the jaws which come into contact with the strand have a mean roughness Ra in accordance with DIN EN ISO 4287:2010 of 0.5 μm to 2 μm.

4. The method as claimed in claim 1, wherein the pressure with which the jaws act upon the strand and a duration of the pressure application are coordinated with each other in a manner such that at least the first jaw can be removed from the strand without leaving a residue.

5. The method as claimed in claim 1, wherein in a region which extends to either side of the interface between the start and the end of the strand, pressure is applied by means of a die on the upper side of the strand.

6. The method as claimed in claim 5, wherein after the pressure is applied to the upper side of the strand by means of the die, the die is lifted from the upper side of the strand before the strand is acted upon by the first jaw and the second jaw on both side faces of the strand.

7. The method as claimed in claim 5, wherein the surfaces with which the jaws and optionally the die act on the strand have rounded edges.

8. The method as claimed in claim 1, wherein the first jaw acts with such a low pressure on the first side face of the strand that it does not leave any indentations on the first side face of the strand which will subsequently delimit the interior space of the insulating glass pane.

9. The method as claimed in claim 5, wherein at least those surfaces of the jaws and optionally of the die which are to come into contact with the strand are heated.

10. The method as claimed in claim 9, wherein the surfaces to be heated are heated to a temperature at which the pasty strand was applied to the glass plate.

11. The method as claimed in claim 9, wherein the surfaces to be heated are heated to a temperature in the range from 80° C. to 130° C.

12. The method as claimed in claim 1, wherein a material based on a polyisobutylene is used as the pasty strand which is subsequently consolidated.

13. The method as claimed in claim 1, wherein at least the surface of the first jaw by means of which pressure is applied to the first side face of the strand has a contour which matches a contour of the first side face of the strand.

14. The method as claimed in claim 13, wherein a contour of the surfaces of the second jaw and optionally a die to be applied to the strand also match the a contour of the second side face of the strand or respectively a contour of the upper side of the strand.

15. The method as claimed in claim 1, wherein in a first step the two jaws are initially disposed with respect to a longitudinal extent of the strand, that a center of their surfaces which are to be placed on the side faces of the strand lies in a center of the region over which the interface between the start and the end of the strand extends, and wherein the jaws act a first time in this position with pressure on the two side faces of the strand, wherein in a second step, the jaws are lifted from the strand and displaced a little further along the strand in a first direction to a second position in which pressure is applied by the two jaws to the side faces, wherein in a third step, the two jaws are displaced in a second direction opposite to the first direction a little further along the strand over and past the center of the region over which the interface between the start and the end of the strand extends, to a third the position in which the two jaws act with pressure on the side faces of the strand, wherein an offset of the two jaws is selected each time in a manner such that the surface regions of the strand on which the displaced jaws act overlap with the central region of the strand in which its side faces were first acted upon by the two jaws.

16. The method as claimed in claim 15, wherein the sequence of the first, second and third steps are repeated at least one more time, wherein in the repeated steps the offsets are identical to the respective preceding offsets.

17. The method as claimed in claim 1, wherein a time during which the pressure is applied on the side faces of the strand is no longer than one second.

18. The method as claimed in claim 16, wherein the time during which pressure is applied for the first time on the side faces of the strand is no longer than one second and is shorter than one second for subsequent applications of pressure.

19. The method as claimed in claim 1, wherein initially the second jaw is set against the second side face of the strand, in order to retain the position of the strand, before subsequently the first jaw is moved against the first side face of the strand in order to apply pressure on the strand while the second jaw is stationary.

20. The method as claimed in claim 1, wherein the first jaw is moved in a manner wherein it does not come into contact with the glass plate.

21. The method as claimed in claim 9, wherein the surfaces to be heated are heated to a temperature in the range from 120° C. to 130° C.

22. The method as claimed in claim 15, wherein the sequence of the first, second and third steps are repeated at least one more time, wherein in the repeated steps respective offsets differ from the preceding offsets.

23. The method as claimed in claim 1, wherein the surfaces of the jaws which come into contact with the strand have a mean roughness Ra in accordance with DIN EN ISO 4287:2010 of 1 μm to 1.5 μm.

\* \* \* \* \*

UNITED STATES PATENT AND TRADEMARK OFFICE
CERTIFICATE OF CORRECTION

PATENT NO. : 11,746,588 B2  
APPLICATION NO. : 16/017245  
DATED : September 5, 2023  
INVENTOR(S) : Peter Schuler Page 1 of 1

It is certified that error appears in the above-identified patent and that said Letters Patent is hereby corrected as shown below:

On the Title Page

Column 1, below the Related U.S. Application Data:  
Insert --Foreign Application Priority Data  
Dec. 29, 2015 (DE).........................10 2015 122 882.3--.

Signed and Sealed this  
Thirty-first Day of October, 2023

Katherine Kelly Vidal  
*Director of the United States Patent and Trademark Office*